United States Patent
Colón et al.

(10) Patent No.: US 11,374,968 B1
(45) Date of Patent: Jun. 28, 2022

(54) DETECTION OF ADVERSARIAL NETWORKS

(71) Applicant: Amazon Technologies, Inc., Seattle, WA (US)

(72) Inventors: Brendan Cruz Colón, Seattle, WA (US); Jason L Thalken, Woodland Hills, CA (US); Adam Edward Powers, Dublin, CA (US); Manraj Tatla, Brampton (CA); Lev Ufimtsev, Toronto (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 45 days.

(21) Appl. No.: 16/909,176

(22) Filed: Jun. 23, 2020

(51) Int. Cl.
*H04L 29/06* (2006.01)
*H04L 9/40* (2022.01)

(52) U.S. Cl.
CPC ................ *H04L 63/1466* (2013.01)

(58) Field of Classification Search
CPC .................................................. H04L 63/1466
See application file for complete search history.

(56) References Cited

U.S. PATENT DOCUMENTS

| | | | | |
|---|---|---|---|---|
| 8,370,948 B2* | 2/2013 | Troyansky | ............... | H04L 51/34 726/26 |
| 9,148,424 B1* | 9/2015 | Yang | ........................ | H04L 63/20 |
| 2010/0313266 A1* | 12/2010 | Feng | .................... | H04L 63/1483 726/23 |
| 2016/0294852 A1* | 10/2016 | Hagen | .................... | H04L 61/301 |
| 2017/0180378 A1* | 6/2017 | Tyler | ..................... | H04L 63/083 |
| 2019/0238562 A1* | 8/2019 | Manadhata | ............. | G06F 21/56 |
| 2019/0306192 A1* | 10/2019 | Xie | ......................... | H04L 51/28 |
| 2019/0370681 A1* | 12/2019 | Oba | ....................... | G06N 20/00 |
| 2020/0137109 A1* | 4/2020 | Endler | ................ | H04L 63/1466 |

OTHER PUBLICATIONS

Yates; The Early Warning Power of IPRN Test Call Detection in Blocking IRSF Fraud; Black Swan Telecom Journal; Jan. 2017; 4 pgs.

* cited by examiner

*Primary Examiner* — Vance M Little
(74) *Attorney, Agent, or Firm* — K&L Gates LLP

(57) ABSTRACT

Devices and techniques are generally described for fraud detection. In various examples, a first plurality of requests are received over a first time period. In at least some examples, the first plurality of requests may be requests to access a first service. A hierarchical data representation comprising an ordered set of values may be determined for each request of the first plurality of requests. A first subset of the first plurality of requests may be determined. The hierarchical data representation associated with each request of the first subset may include fewer than a threshold number of value substitutions relative to each other hierarchical data representation of the first subset of the first plurality of requests. Access to the first service may be prevented by subsequent requests associated with the first subset of the first plurality of requests.

18 Claims, 6 Drawing Sheets

DETECTION OF ADVERSARIAL NETWORKS

BACKGROUND

Online fraud attempts and denial-of-service (DoS) attacks continue to grow year-over-year, putting pressure on online entities and network administrators to innovate in order to protect customers, revenue, and prevent service disruption. The field of online fraud detection and cyberattack prevention can be categorized as an adversarial environment, where those with intentions to commit fraud and/or malicious cyber attacks are pitted against those endeavoring to prevent and deter such activity. This "arms race," as it is often referred to, involves continuous adaptation, as tactics of the opponents evolve over time.

DETAILED DESCRIPTION

Figure 1:
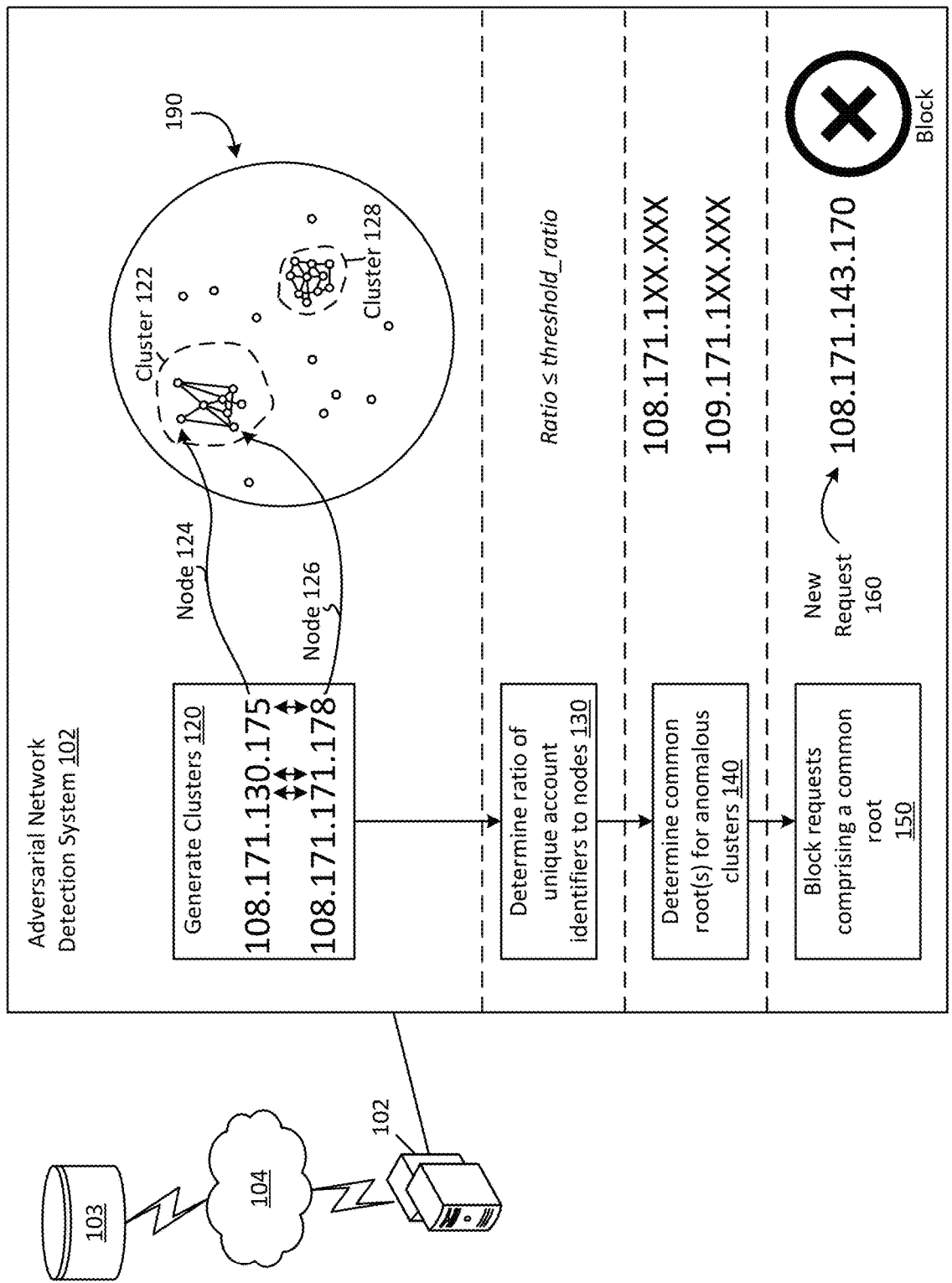
FIG. 1 is a block diagram illustrating detection of an adversarial network and prevention of adversarial attacks, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Perpetrators of transactional fraud and other cyber-attacks continually attempt to modify their behavior and/or the characteristics of their attacks and/or fraudulent transactions in order to avoid detection by automated filters and/or machine learning models used to distinguish between potentially fraudulent transactions and non-fraudulent transactions. As a result, technologies are continuously developed by fraud prevention and cyber-security teams to attempt to detect and prevent such attacks in an ever-evolving climate. Accordingly, the actions of perpetrators of fraud and other cyber attacks and cyber security teams are adversarial in nature, as a change in attack detection techniques results in evolving attack methodologies, and vice versa.

In various examples, attackers modify network identifiers in order to mask the identity of the attacker and/or to make the attacks appear as though they are legitimate service requests. For example, attackers may modify phone numbers, internet protocol (IP) addresses, geo-location data, and/or other hierarchical data representations associated with attacks and/or fraudulent transactions in order to cyber attack prevention measures.

In an example of such attacks, some online services provide a "click to call" service (or other call-back service) whereby users can provide a telephone number and may request a call from the online service (e.g., for technical support) using a graphical user interface provided by the online service. However, perpetrators of fraud (sometimes referred to as "fraudsters") have set up premium phone numbers that charge the online service a fee every time the phone number is called. The fraudsters may set up automated systems whereby they make a large volume of click-to-call requests causing the click-to-call service to call premium phone numbers in order to defraud the company providing the click to call service. In order to avoid fraud detection filters, the IP addresses used to make such requests and/or the premium phone numbers themselves may be modified over time such that it appears as though different IP addresses and/or phone numbers are being used, when in reality the IP addresses and/or phone numbers are part of the same fraudulent scheme.

However, it has been observed that such modification of IP addresses and phone numbers (and more generally modification of any hierarchical data representations) to avoid detection typically preserves large proportions of the original sequence—typically modifying only a few numbers. Accordingly, accounts that are associated with large IP/phone number pools generally have several clusters with very similar sequences. Traditional means of determining similarity in a feature space often include determining a Euclidean and/or cosine distance between data points. However, Euclidean distance determination is extremely sensitive to the position of a changing value within numbers. For example, the Euclidean difference between the numbers 1,000 and 1,001 is relatively small, but the Euclidean difference between the numbers 9,000 and 1,000 is much larger, despite only a single digit being changed in each of the two examples.

Accordingly, in various examples described herein, hierarchical data representations (such as phone numbers, IP addresses, geolocation coordinates, etc.) may be treated as strings and a distance between any two strings may be represented by the number of "edits" or "substitutions" between the two strings. For example, the strings "Brendan" and "Brandon" may be 2 edits apart and the phone numbers (555) 555-6161 and (555) 555-6999 may be 3 edits apart. Determining the number of edits or substitutions between two strings in this way is sometimes referred to as determining the Levenshtein distance between two strings/numbers.

In various examples described herein, clusters of requests with hierarchical data representations (e.g., IP addresses, phone numbers, etc.) that are similar to one another (as determined by Levenshtein distance) and that are received within a predetermined amount of time (e.g., 5 minutes, 10 minutes, or some other suitable time period) may be determined. In various examples, such clusters of requests may be designated as anomalous (e.g., potentially malicious) if the ratio of the number of unique accounts (e.g., unique user accounts) associated with the requests to the number of requests in the cluster is less than a threshold ratio (e.g., 0.85, 0.9, or some other threshold ratio). Typically, valid requests made during a relatively short time period tend to have a 1-to-1 correspondence between the number of unique user accounts making the request and the total number of requests in a given cluster. Accordingly, if the ratio is significantly less than 1.0 there is a higher likelihood that the cluster of requests are related to an attack.

During the relevant time period, nodes (e.g., each node representing a phone number, IP address, or other hierarchical data representation) are connected and/or otherwise conceptually grouped into a cluster if the number of value substitutions (e.g., the Levenshtein distance) is less than or equal to a threshold value. Thereafter, the ratio of the number of unique accounts to the number of nodes of the cluster (e.g., the connected nodes) is determined and is compared to a threshold ratio. The cluster is denoted as anomalous if the ratio is less than the threshold ratio. The common root(s) of the hierarchical data structures of nodes in a cluster denoted as anomalous is determined. The common root(s) may be the ordered values in the hierarchical data representations that are shared among the nodes of the anomalous cluster. For example, a subset of IP addresses associated with an anomalous cluster may have the same values for the first 3 octets of the IP addresses (e.g., all nodes may be 192.141.8.XXX). Thereafter, any new requests that are received with IP addresses that match this common root may be prevented from accessing the requested service, as such IP addresses may be associated with the adversarial network represented by the anomalous cluster. In some examples, the IP addresses may be blocked for a specified period of time in order to avoid blocking legitimate service requests. For example, an IP address may be blocked by preventing and/or denying access by the IP address to the requested service. Similarly, in some examples, anomalous clusters may be defined for a particular period of time to avoid static definitions of adversarial networks. Further, as described in further detail below, various techniques may be implemented to avoid and/or limit the number of false positives (e.g., the blocking of a legitimate request). Blocked nodes (e.g., blocked IP addresses, phone numbers, etc.) may be added to a list of IP addresses that may be prevented from accessing the particular service for a limited period of time (e.g., 30 minutes, 1 hour, 1 day, etc.).

In various examples, IP addresses/phone numbers/etc. on a blocked list may be monitored to determine if any of the blocked addresses are associated with a false positive. For example, if a particular IP address attempts to access the service through a different channel (e.g., email as opposed to a call-back service) the blocking of the IP address may be determined to be a false positive. In an example, if the number of false positives on the blocked list is above a certain percentage, an alert may be triggered and the blocked list may be evaluated by a human evaluator. In another example, a false positive that is incorrectly blocked from accessing a service may be granted access to the service after the blocked list expires (e.g., after 30 minutes, etc.). However, a blocked list's tenure may be renewed, extending the expiration time, if the potentially adversarial address(es) continually attempt to request the service.

FIG. 1 is a block diagram illustrating example components of an adversarial network detection system 102, according to various embodiments of the present disclosure. In various examples, one or more computing devices may implement the adversarial network detection system 102. In examples where more than one computing device implements the adversarial network detection system 102, the different computing devices may communicate with one another over a network 104. In various examples, each of the one or more computing devices used to implement adversarial network detection system 102 may comprise one or more processors. The one or more computing devices used to implement adversarial network detection system 102 may be configured in communication with at least one non-transitory computer readable memory 103 ("memory 103"). In at least some examples, the one or more computing devices used to implement adversarial network detection system 102 may communicate with memory 103 over network 104. The memory 103 may store computer-readable instructions that, when executed by at least one processor of the one or more computing devices implementing adversarial network detection system 102, may be effective to program the one or more processors to perform the various techniques described herein.

In various examples, network 104 is a wide area network, such as the Internet, while in other embodiments, the network 104 is a local area network (LAN) over which requests may be received. In some further embodiments network 104 is a combination of the Internet and a LAN.

In various examples, the adversarial network detection system 102 may receive a plurality of requests. The requests may be requests to access a compute service, a click-to-call service, online purchase requests, online support requests, and/or any type of request that may be made over a communications network. In various examples, adversarial network detection system 102 may receive the requests and may determine hierarchical data representations associated with each request. The hierarchical data representations may be any hierarchical representation of data, such as telephone numbers, IP addresses, geolocation coordinates, etc. Hierarchical data representations represent some hierarchy of data. For example, in an IP address, the first sequence of bits (e.g., the first octet in IPv4) may represent a network, while the final bits (e.g., of the final, right-most octet) may represent an individual node. In some examples, the middle two octets of an IP address may represent sub-networks, for easier request routing. Similarly, in phone numbers, the first digits (e.g., the left-most digits) typically represent the highest category of geographic locations (e.g., country codes), while the next level of digits may represent an area code. In some examples, the following digits may represent a city and/or a portion of a city, etc.

As requests for the relevant service are received, adversarial network detection system 102 may determine the positions of the nodes (with each node being represented by its corresponding hierarchical data representation) within a feature space 190. In various examples, adversarial network detection system 102 may generate clusters (action 120) of nodes over time periods. The time periods may be parameters that are pre-selected and/or that are determined based on, for example, a rate at which requests are being received.

In the example depicted in FIG. 1, a first request may be received from the IP address 108.171.130.175. The first request may be represented as node 124 in feature space 190. Similarly, a second request may be received from the IP address 108.171.171.178. The second request may be represented as node 126 in feature space 190. Adversarial network detection system 102 may determine the number of value substitutions/differences/additions/deletions between the first request and the second request (e.g., between nodes 124 and 126). As indicated by the double-headed arrows in FIG. 1, there are 3 value substitutions between the IP address of the first request and the IP address of the second request (e.g., a Levenshtein distance of 3). The number of value substitutions/differences (e.g., the Levenshtein distance) may be compared to a threshold value. The threshold value may be a tunable parameter that may be manually selected and/or determined based on data representing a corpus of nodes (e.g., based on training data used to train a machine learning model that outputs an appropriate threshold value based on current and/or historical conditions). In an example, the threshold number of value substitutions may be 4. If two nodes (e.g., two hierarchical data representations) have a distance that is less than or equal to the threshold number, the nodes may be connected (e.g., clustered together) by adversarial network detection system 102.

In the current example, there are three substitutions between the IP address of node 124 and the IP address of node 126. Accordingly, the number of substitutions is less than the threshold and the nodes are clustered together into cluster 122. In the example depicted in FIG. 1 a plurality of other nodes are clustered together in cluster 128. In an example, two nodes are connected in the cluster if the number of value substitutions between the two nodes is less than or equal to (or simply less than in other embodiments) the threshold number.

Adversarial network detection system 102 may determine, for each cluster, a ratio of the number of unique account identifiers (and/or unique user identifiers) to the number of nodes (action 130). For example, adversarial network detection system 102 may determine the account identifier associated with each node of cluster 122. Account identifiers (or other identifying data) may be provided as metadata along with the service request (e.g., as a result of a user logging in prior to requesting the service). In various examples, requests that are not associated with any account identifiers (or other identifying data) may be considered as emanating from a single entity. The ratio of unique account identifiers to the number of requests/nodes in a cluster may be compared to a threshold ratio. If the ratio is less than the threshold ratio (or less than or equal to depending on the implementation), the cluster may be marked as anomalous for purposes of further processing/attack prevention. In various examples, to avoid unnecessarily blocking legitimate requests, adversarial network detection system 102 may only designate clusters as anomalous when greater than or equal to a threshold number of connected nodes/requests are determined during a particular time period. For example, a cluster may be denoted as anomalous only where greater than or equal to 10 (or any other suitable number) requests have been received within the past 3 minutes.

For example, there may be 20 nodes in cluster 122 (representing 20 separate requests for a service). Among the 20 nodes, 10 may be associated with a single account identifier and 5 may not be associated with any account identifier. Each of the remaining 5 nodes may be associated with their own, respective account identifiers. Accordingly, in the current example the ratio=(1+1+5)/20=7/20=0.35. In the current example, the threshold ratio may be 0.65 (although any suitable value may be used). Since the calculated ratio is less than the threshold ratio, cluster 122 may be designated as anomalous.

Adversarial network detection system 102 may determine the common root(s) for anomalous clusters (action 140). In various examples, upon designation of a cluster as anomalous, adversarial network detection system 102 may determine the common root(s) among the hierarchical data representations associated with that cluster. Each IP address includes a set of ordered numbers (e.g., 4 octets). The common root may be the set of ordered numbers common to a subset of nodes of the anomalous clusters (or to all nodes of the anomalous cluster). For example, all the IP addresses associated with at least some nodes of cluster 122 may include the same values for the first 2 octets—108 and 171, respectively. Similarly, the third octet, when expressed in decimal notation, may have three digits and all nodes may have a 1 as the first digit, although the remaining two digits may differ among the different nodes. Accordingly, in decimal form, the common root for cluster 122 may be 108.171.1XX.XXX with the Xs representing variable, generic values. Although in the foregoing example, the common root comprises only contiguous values within the decimal representation of the IP addresses, in at least some examples, the common values need not be contiguous. In some examples, data at higher hierarchical levels representing more general data (e.g., the first octet and/or first two octets of an IP address and/or the area code of a telephone number) may be disregarded for purposes of determining the common root(s). For example, there may be a single substitution between the IP address 108.171.130.175 and the IP address 109.171.130.175. However, since this substitution occurs in the first octet (e.g., replacing the "8" with the "9"), this substitution may be ignored. In the example, the common roots for this example cluster may be determined to be any IP address beginning with 108.171.XXX.XXX or 109.171.XXX.XXX, as the first two octets may be disregarded.

Adversarial network detection system 102 may thereafter block incoming requests (e.g., prevent access to one or more services) associated with the common root (action 150). For example, new request 160 may be from IP address 108.171.143.170 that includes the common root 108.171.1XX.XXX determined at action 140. Accordingly, the new request 160 may be blocked. In various examples, to avoid blocking legitimate requests, requests may be blocked only if they are received within a threshold amount of time from designation of a cluster as anonymous. In some other examples, incoming requests may be blocked if they are a threshold distance (e.g., Levenshtein distance) from any of the common roots.

Figure 2:
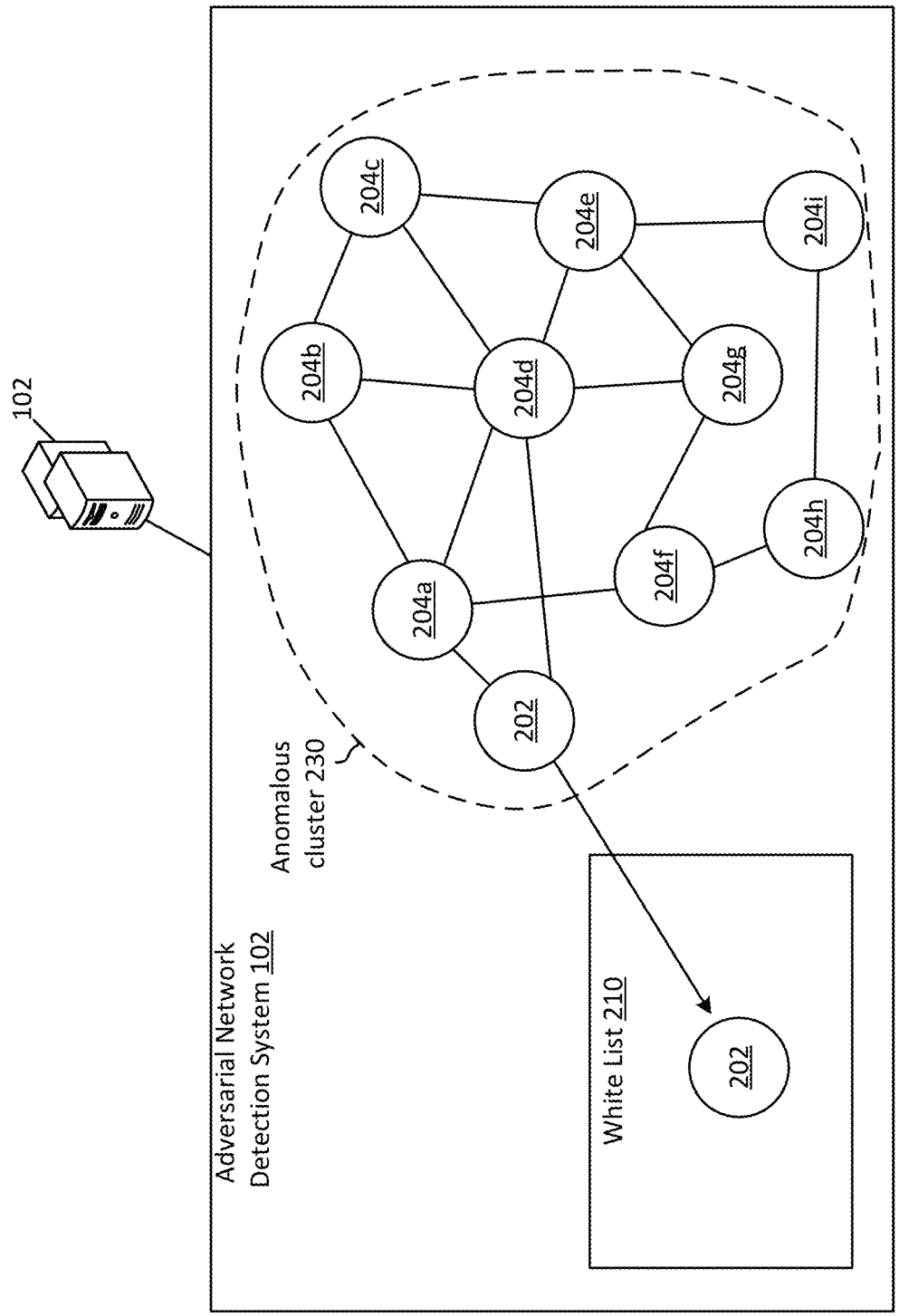
FIG. 2 is a block diagram illustrating detection of a false positive in an anomalous network, in accordance with various embodiments of the present disclosure.

FIG. 2 is a block diagram illustrating detection of a false positive in an anomalous network, in accordance with various embodiments of the present disclosure. In various examples, after determining an anomalous cluster 230 believed to represent illegitimate requests, one or more legitimate requests may be received that might be prevented from accessing the relevant service due to these legitimate requests being similar to nodes of the anomalous cluster 230. Such legitimate requests may be described herein as "false positives."

For example, a node 202 may be from a phone number that has a common root to a plurality of nodes 204a-204i of anomalous cluster 230. Accordingly, although node 202 may be a legitimate request, without the various techniques described herein, node 202 may be blocked from accessing the relevant service.

In some examples, metadata related to the various requests/nodes may be provided along with the request for the relevant service. Typically, fraudulent and/or malicious requests relate to the same service and/or to the same request channel. Accordingly, one way of detecting false positives is to determine that the metadata indicating the request type indicates that a particular request relates to a different service relative to other requests of the node. In another example, the request may be from a different channel (e.g., voice vs. chat) as compared to other requests of the node. In the example of FIG. 2, nodes 204a-204i may be related to requests to obtain a customer support call back, while node 202 may be a request to cancel a pending order. In an example embodiment, since node 202 pertains to a different request type relative to the other nodes 204a-204i of anomalous cluster 230, the node 202 may be added to a white list 210 and may be permitted to access the relevant service. The node 202 may be white-listed by adding the telephone number, IP address, etc., associated with node 202 to a trusted list (sometimes referred to as a white list). In various other examples, instead of adding the node 202 to a whitelist an alert may be generated for the particular node/request to be investigated to determine whether or not the request is potentially fraudulent.

In another example embodiment, after being prevented from accessing the requested service, node 202 may attempt to obtain assistance through a different channel that is communicatively coupled to the adversarial network detection system 102. For example, node 202 may be from an IP address that initially attempts to access customer service through a click-to-call button displayed on a graphical user interface. After being prevented from using the click-to-call service (e.g., due to node 202 being grouped in anomalous cluster 230), the same IP address may send a request to initiate a customer support chat. Attempts by a node to access multiple different services may be an indication that the node represents a legitimate request. Accordingly, nodes that attempt to access multiple different services may be deemed legitimate and may be added to white list 210. Upon being cleared (e.g., added to white list 210) a subsequent attempt to access a service (e.g., a subsequent access) may be permitted.

In addition to detecting false positives using the various techniques described above, false negatives may also be estimated. Generally, false negative estimation may be performed by determining a "location" of the attacks (e.g., a particular port, service, network address, click-to-call button, etc.—referred to generally as a "request-initiating control") and isolating network traffic from that request-initiating control. For example, each click-to-call button and/or other request-initiating control may be associated with metadata identifying that button from among other buttons/request-initiating controls. In some examples, different buttons (or other request-initiating controls) may be associated with different services provided by an entity. For example, a first button may request help with a product, while a second button may request help with a video chat service. For each request-initiating control the number of networks are determined. In this context, a "network" is a group of two or more IP addresses with fewer than a threshold number of value substitutions with respect to one another, and that has a ratio of unique accounts to total IP addresses of ≤a threshold ratio (e.g., 0.85 or some other suitable value). For each request-initiating control, the ratio of unique accounts to the number of networks for that request-initiating control is determined. If the ratio is less than a threshold, the request-initiating control (e.g., the particular click-to-call button) is determined to be under attack. In an example, the threshold may be 0.04, although any suitable value may be used in accordance with the desired implementation. If a particular request-initiating control is determined to be under attack, all networks with two or more nodes associated with the request-initiating control are determined to be adversarial (even if the number of nodes in the network is smaller than the threshold cluster size described above in reference to FIG. 1). In some example embodiments, a ratio of the unique accounts to the number of IP address can be determined and compared to a threshold ratio for each network prior to blocking traffic from that network. Such traffic may be blocked for a pre-determined amount of time (or indefinitely).

The process described above allows for traffic that is likely to be adversarial to be removed for a particular request-initiating control so that a non-attack counterfactual may be determined. By subtracting the estimate of attack traffic from total traffic, the amount of legitimate non-attack traffic may be estimated and used to determine patterns of legitimate traffic over time.

Figure 3:
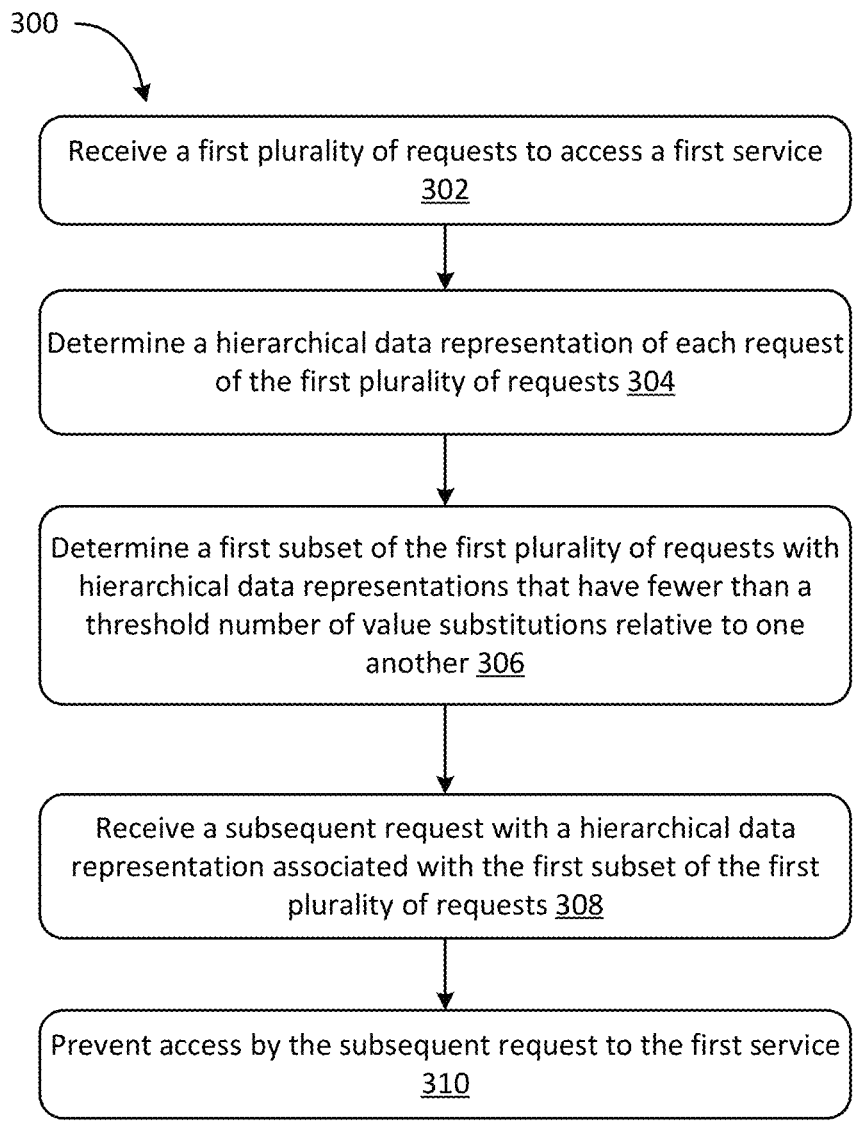
FIG. 3 is a flow diagram illustrating an example process for prevention of an adversarial attack, in accordance with various aspects of the present disclosure.

FIG. 3 depicts a flow chart showing an example process 300 for detection of adversarial networks, in accordance with various aspects of the present disclosure. The process 300 of FIG. 3 may be executed by one or more computing devices. The actions of process 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 300 may be described above with reference to elements of FIGS. 1-2.

Process 300 may begin at action 302, at which a first plurality of requests to access a first service may be received. In various examples, the first plurality of requests may be received within a particular time period (e.g., within 1, 2, 3, 5, 7, 10 minutes, etc.). The first plurality of requests may be requests to access a particular service. For example, a chat service, a click-to-call service, an online transaction, a compute service, etc.

Processing may continue from action 302 to action 304, at which a hierarchical data representation of each request of the first plurality of requests may be determined. At action 304, a hierarchical data representation may be determined for each request of the first plurality of requests and the hierarchical data representations may be compared to one another (e.g., within feature space 190) in order to form clusters.

Processing may continue from action 304 to action 306 at which a first subset of the first plurality of requests may be determined. The first subset of requests may have hierarchical data representations that have fewer than a threshold number of value substitutions (e.g., fewer than a threshold number of different values) relative to one another. For example, the geolocation data, IP addresses, phone numbers, etc., of the first subset may all include fewer than a threshold number of value substitutions when compared to one another. In other words, the Levenshtein distance between any two nodes of the first subset may be less than the threshold distance, indicating a similarity between the two nodes.

Processing may continue from action 306 to action 308, at which a subsequent request may be received with a hierarchical data representation that is associated with the first subset of the first plurality of requests. For example, after determining a first anomalous cluster of nodes/requests, a new request may be received. The hierarchical data representation associated with the new request may likewise have fewer than the threshold number of value substitutions with respect to nodes of the anomalous cluster and may thus be associated with the anomalous cluster. In another example, the new request may include a hierarchical data representation that includes a common root with respect to the nodes of the anonymous cluster.

Processing may continue from action 308 to action 310, at which access by the subsequent request to the first service may be prevented. In an example, the subsequent request may be blocked due to its similarity to the requests in the anomalous cluster (e.g., due to the subsequent request having a common root with respect to nodes of the anomalous cluster and/or due to the subsequent request being within a threshold Levenshtein distance to the nodes in the anomalous cluster).

Figure 4:
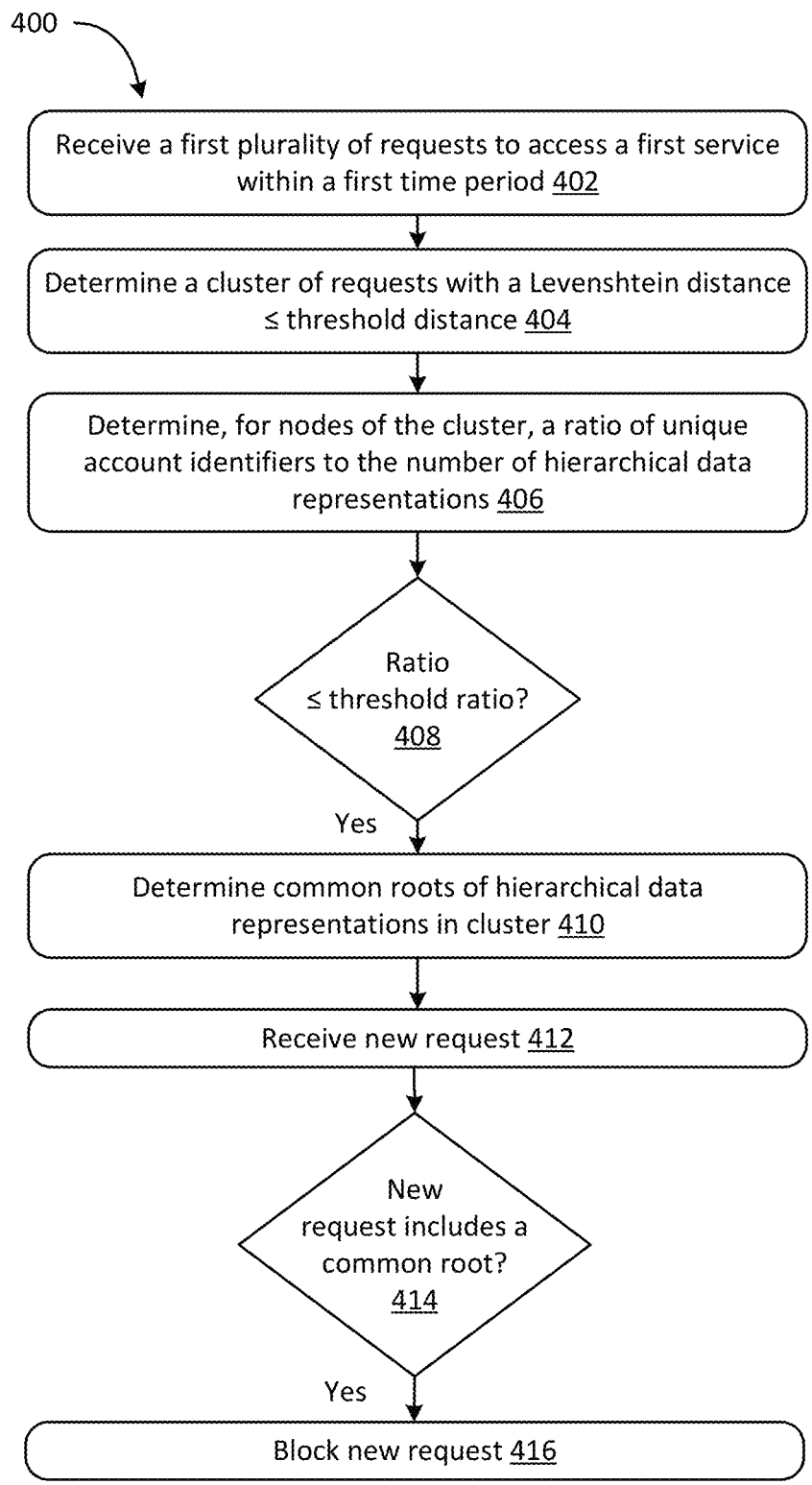
FIG. 4 is a flow diagram illustrating another example process for prevention of an adversarial attack, in accordance with various aspects of the present disclosure.

FIG. 4 is a flow diagram illustrating another example process 400 for prevention of an adversarial attack, in accordance with various aspects of the present disclosure. The process 400 of FIG. 4 may be executed by one or more computing devices. The actions of process 400 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 400 may be described above with reference to elements of FIGS. 1-3.

Process 400 may being at action 402, at which a first plurality of requests to access a first service within a first time period are received. The first plurality of requests may be requests to access a particular service. For example, a chat service, a click-to-call service, an online transaction, a compute service, etc.

Processing may continue from action 402 to action 404, at which a cluster of requests with a Levenshtein distance that is less than or equal to a threshold distance may be determined. In various examples, each request of the first plurality of requests may be compared to each other request. If the number of value substitutions between two requests is less than the threshold number (e.g., if the Levenshtein distance is less than or equal to the threshold distance) the requests are grouped together in a cluster.

Processing may continue from action 404 to action 406, at which a ratio of the number of unique account identifiers in the cluster to the total number of nodes in the cluster (e.g., the number of hierarchical data representations) may be determined. At action 408, the ratio may be compared to a threshold ratio. If the ratio is greater than the threshold ratio, the cluster may be designated as non-anomalous and the requests of the cluster may be permitted to access the requested service.

Conversely, if the ratio is less than or equal to the threshold ratio, processing may continue to action 410, at which one or more common roots of the hierarchical data representations in the cluster may be determined. At action 410, the cluster may be designated as anomalous as a result of the ratio of unique account identifiers to the number of nodes in the cluster being less than or equal to the threshold ratio. Common roots of the nodes of the cluster may be determined. The common root(s) may be the common portions of the hierarchical data representations of the nodes of the cluster.

Processing may continue from action 410 to action 412, at which a new request may be received. In various examples, the new request may be associated with a hierarchical data representation (e.g., an IP address, a phone number, geo-location data, etc.). Additionally, metadata may be received with the new request indicating an account identifier, a request type, etc. At action 414, a determination may be made whether or not the new request has a hierarchical data representation that includes one of the common roots (and/or is within a threshold distance of one of the common roots) determined at action 410. If the new request has a hierarchical data representation that includes one of the common roots the new request may be blocked at action 416. In other words, the new request may be deemed malicious and may be prevented from accessing the requested service. In some further examples, the hierarchical data representation associated with the new request may be added to the anomalous cluster and/or the hierarchical data representation may be black listed for future requests. In various examples, if the hierarchical data representation associated with the new request does not match any of the common roots and/or is greater than a threshold distance away from the common roots, the new request may be permitted to access the requested service as the new request may be deemed legitimate.

Figure 5:
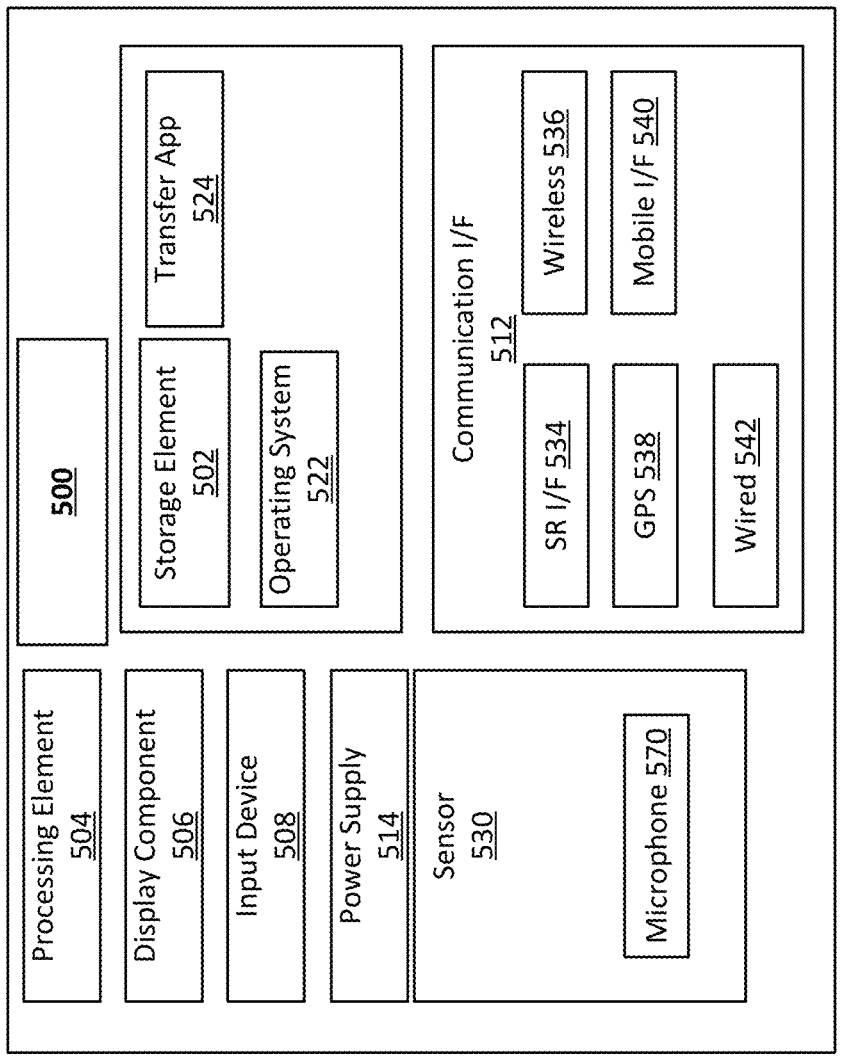
FIG. 5 is a block diagram showing an example architecture of a computing device that may be used in accordance with various embodiments described herein.

FIG. 5 is a block diagram showing an example architecture 500 of a computing device that may be configured to detect adversarial networks, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or hierarchical data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
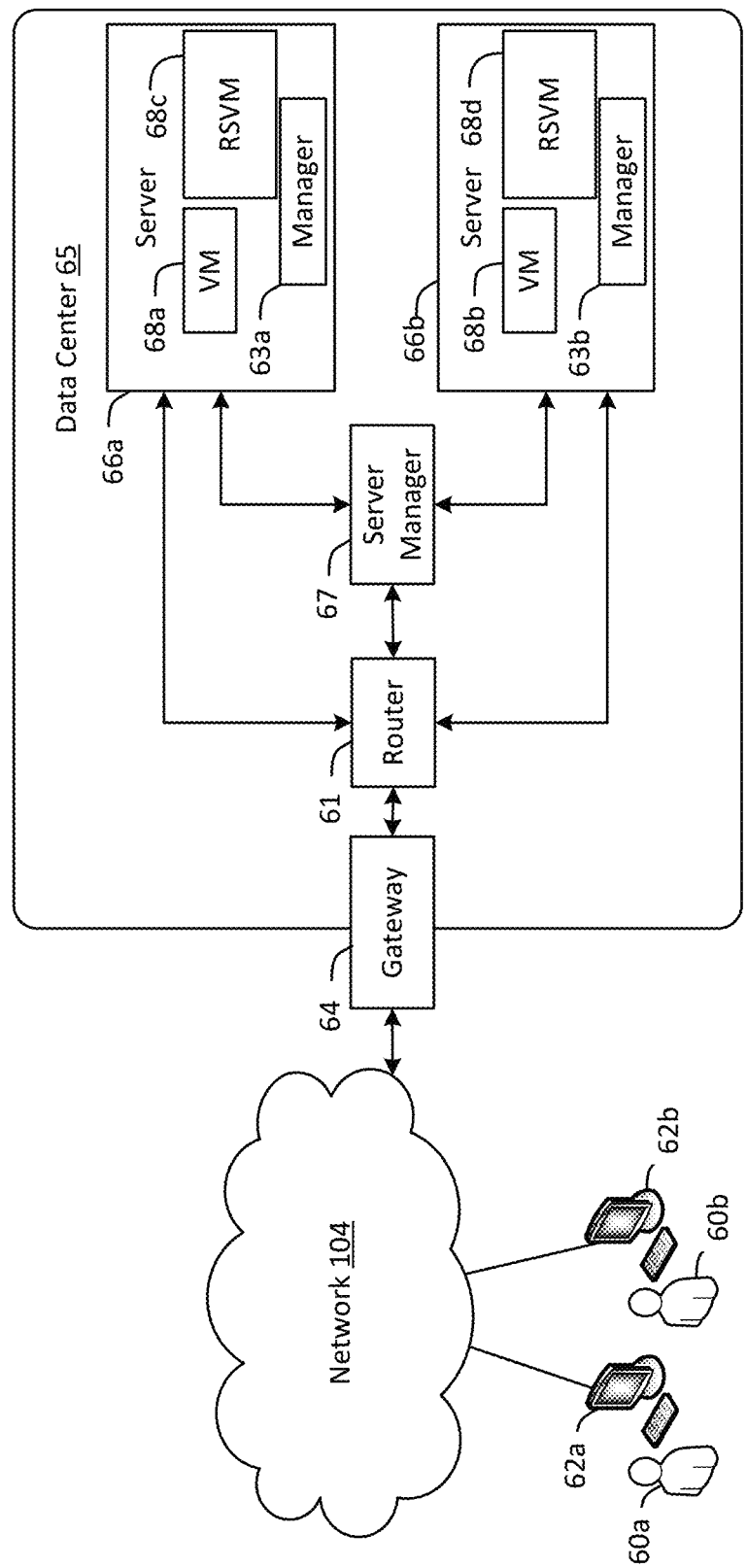
FIG. 6 is a diagram illustrating an example system for sending and providing data that may be used in accordance with the present disclosure.

An example system for sending and providing data and detecting adversarial networks will now be described in detail. In particular, FIG. 6 illustrates an example computing environment in which the embodiments described herein may be implemented. For example, the computing environment of FIG. 6 may be configured to provide adversarial network detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of detecting adversarial networks, the method comprising:
   determining, over a first time period, a first group of internet protocol (IP) addresses, wherein each IP address of the first group of IP addresses, when expressed in decimal notation, comprises four or fewer different values from each other IP address of the first group of IP addresses;
   determining a number of unique user identifiers associated with the first group of IP addresses;
   determining a ratio of the number of unique user identifiers to a number of IP addresses in the first group of IP addresses;
   determining that the ratio is less than a threshold ratio; and
   preventing the first group of IP addresses from accessing a call-back service in response to the ratio being less than the threshold ratio.

2. The computer-implemented method of claim 1, further comprising:
   determining a set of ordered numbers common to each of the IP addresses of the first group of IP addresses;
   receiving a first request from a first IP address to access the call-back service;
   determining that the first IP address includes the set of ordered numbers; and
   determining that a return telephone call not be made in response to the first request based at least in part on the determination that the first IP address includes the set of ordered numbers.

3. The computer-implemented method of claim 2, further comprising:
   receiving a second request from the first IP address to access a second service, different from the call-back service; and
   allowing the second request from the first IP address to access the second service.

4. The computer-implemented method of claim 2, further comprising:
   determining a first user identifier associated with the first request from the first IP address;
   receiving, after receiving the first request, a second request from the first IP address to access a second service different from the call-back service; and
   allowing the second request to access the second service.

5. A method comprising:
   receiving a first plurality of requests over a first time period, the first plurality of requests being requests to access a first service;
   determining a hierarchical data representation of each request of the first plurality of requests, each of the hierarchical data representations comprising an ordered set of values;
   determining a first subset of the first plurality of requests, wherein the hierarchical data representation associated with each request of the first subset includes fewer than a threshold number of value substitutions relative to each other hierarchical data representation of the first subset of the first plurality of requests;
   determining a number of unique account identifiers associated with the first subset of the first plurality of requests;
   determining a number of hierarchical data representations associated with the first subset of the first plurality of requests;
   determining a ratio of the number of unique account identifiers to the number of hierarchical data representations associated with the first subset of the first plurality of requests; and
   preventing access to the first service by subsequent requests associated with the first subset of the first plurality of requests.

6. The method of claim 5, further comprising:
   determining a threshold ratio; and
   determining that the ratio of the number of unique account identifiers to the number of hierarchical data representations associated with the first subset of the first plurality of requests is less than the threshold ratio, wherein the preventing access to the first service by subsequent requests associated with the first subset of the first plurality of requests is based at least in part on the ratio of the number of unique account identifiers to the number of hierarchical data representations associated with the first subset of the first plurality of requests being less than the threshold ratio.

7. The method of claim 5, further comprising:
   determining a set of common values among the hierarchical data representations of the first subset of the first plurality of requests;
   receiving a second request at a second time period following the first time period;
   determining that a hierarchical data representation associated with the second request comprises the set of common values; and
   preventing access to the first service by the second request.

8. The method of claim 7, further comprising:
   determining that the second request is related to a second service, different from the first service; and
   allowing the second request to access the second service.

9. The method of claim 7, further comprising:
   determining a first user identifier associated with the second request;
   receiving, after receiving the second request, a third request to access a third service different from the first service; and
   allowing subsequent access to the first service by requests associated with the hierarchical data representation associated with the second request.

10. The method of claim 5, further comprising:
    determining a first number of requests among the first subset of the first plurality of requests that are not associated with an account identifier;
    determining a second number of hierarchical data representations associated with the first subset of the first plurality of requests; and
    determining a ratio of the first number of requests to the second number of hierarchical data representations; and
    determining that the ratio is less than a threshold ratio.

11. The method of claim 5, wherein the hierarchical data representations include at least one of a phone number or an internet protocol (IP) address.

12. A system, comprising:
    at least one processor; and
    at least one non-transitory computer-readable memory configured in communication with the at least one processor, the at least one non-transitory computer-readable memory storing instructions that, when executed by the at least one processor, are effective to program the at least one processor to:

receive a first plurality of requests over a first time period, the first plurality of requests being requests to access a first service;

determine a hierarchical data representation of each request of the first plurality of requests, each of the hierarchical data representations comprising an ordered set of values;

determine a first subset of the first plurality of requests, wherein the hierarchical data representation associated with each request of the first subset include fewer than a threshold number of value substitutions relative to each other hierarchical data representation of the first subset of the first plurality of requests;

determine a number of unique account identifiers associated with the first subset of the first plurality of requests;

determine a number of hierarchical data representations associated with the first subset of the first plurality of requests;

determine a ratio of the number of unique account identifiers to the number of hierarchical data representations associated with the first subset of the first plurality of requests; and prevent access to the first service by subsequent requests associated with the first subset of the first plurality of requests.

13. The system of claim 12, the at least one non-transitory computer-readable memory storing further instructions that, when executed by the at least one processor, are further effective to program the at least one processor to:

determine a threshold ratio; and determine that the ratio of the number of unique account identifiers to the number of hierarchical data representations associated with the first subset of the first plurality of requests is less than the threshold ratio, wherein the preventing access to the first service by subsequent requests associated with the first subset of requests is based at least in part on the ratio of the number of unique account identifiers to the number of hierarchical data representations associated with the first subset of the first plurality of requests being less than the threshold ratio.

14. The system of claim 12, the at least one non-transitory computer-readable memory storing further instructions that, when executed by the at least one processor, are further effective to program the at least one processor to:

determine a set of common values among the hierarchical data representations of the first subset of the first plurality of requests;

receive a second request at a second time period following the first time period;

determine that a hierarchical data representation associated with the second request comprises the set of common values; and prevent access to the first service by the second request.

15. The system of claim 14, the at least one non-transitory computer-readable memory storing further instructions that, when executed by the at least one processor, are further effective to program the at least one processor to:

determine that the second request is related to a second service, different from the first service; and allow the second request to access the second service.

16. The system of claim 14, the at least one non-transitory computer-readable memory storing further instructions that, when executed by the at least one processor, are further effective to program the at least one processor to:

determine a first user identifier associated with the second request;

receive, after receiving the second request, a third request to access a third service different from the first service; and allow subsequent access to the first service by requests associated with the hierarchical data representation associated with the second request.

17. The system of claim 12, the at least one non-transitory computer-readable memory storing further instructions that, when executed by the at least one processor, are further effective to program the at least one processor to:

determine a first number of requests among the first subset of the first plurality of requests that are not associated with an account identifier;

determine a second number of hierarchical data representations associated with the first subset of the first plurality of requests; and determine a ratio of the first number of requests to the second number of hierarchical data representations; and determine that the ratio is less than a threshold ratio.

18. The system of claim 12, wherein the hierarchical data representations include at least one of a phone number or an internet protocol (IP) address.

* * * * *